US011875723B2

(12) United States Patent
Park et al.

(10) Patent No.: US 11,875,723 B2
(45) Date of Patent: Jan. 16, 2024

(54) DISPLAY DEVICE AND METHOD OF DRIVING DISPLAY DEVICE

(71) Applicant: SAMSUNG DISPLAY CO., LTD., Yongin-si (KR)

(72) Inventors: Sehyuk Park, Seongnam-si (KR); Hae-Kwan Seo, Hwaseong-si (KR); Youngha Sohn, Seongnam-si (KR); Jin-Wook Yang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/814,411

(22) Filed: Jul. 22, 2022

(65) Prior Publication Data

US 2023/0154377 A1 May 18, 2023

(30) Foreign Application Priority Data

Nov. 18, 2021 (KR) ........................ 10-2021-0159509

(51) Int. Cl.

| | |
|---|---|
| ***G09G 3/32*** | (2016.01) |
| ***G09G 3/20*** | (2006.01) |
| *G09G 3/3275* | (2016.01) |
| *G09G 3/36* | (2006.01) |
| *G09G 3/3291* | (2016.01) |
| *G09G 3/3208* | (2016.01) |
| *G09G 3/3266* | (2016.01) |

(52) U.S. Cl.

CPC ......... *G09G 3/2092* (2013.01); *G09G 3/3208* (2013.01); *G09G 3/3266* (2013.01); *G09G 3/3275* (2013.01); *G09G 3/3291* (2013.01); *G09G 3/3685* (2013.01); *G09G 2300/0426* (2013.01); *G09G 2310/0272* (2013.01); *G09G 2310/0275* (2013.01); *G09G 2380/02* (2013.01)

(58) Field of Classification Search

CPC ......... G09G 3/2092; G09G 2310/0272; G09G 3/3275; G09G 3/3685; G09G 3/3291; G09G 3/3208; G09G 3/3266; G09G 2300/0426; G09G 2310/0275; G09G 2380/02

See application file for complete search history.

(56) References Cited

U.S. PATENT DOCUMENTS

| | | | | |
|---|---|---|---|---|
| 8,627,965 | B2 | 1/2014 | Hardy | |
| 2015/0009128 | A1* | 1/2015 | Matsumoto | G06F 3/0412 345/76 |
| 2019/0033919 | A1* | 1/2019 | Hirakata | G06F 3/041 |
| 2019/0279555 | A1* | 9/2019 | Kim | G09G 3/3685 |
| 2020/0111993 | A1 | 4/2020 | Ma et al. | |
| 2020/0258921 | A1* | 8/2020 | Takahashi | G09G 3/3648 |

* cited by examiner

*Primary Examiner* — Adam J Snyder
(74) *Attorney, Agent, or Firm* — F. CHAU & ASSOCIATES, LLC

(57) ABSTRACT

A display device, which is a slidable display device, includes a display panel and a data driver. The display panel includes a first display area, a second display area that is in one of a taken-in position and a taken-out-of position of the display device, and a pad area located on one side of the first display area. The display panel includes pixels disposed in the first and second display areas, and is driven in a first mode in which an image is displayed in the first display area or a second mode in which an image is displayed in the first and second display areas. The data driver generates data voltages based on pixel data, outputs the data voltages to the pixels, and controls an order of the data voltages output in the second mode.

19 Claims, 9 Drawing Sheets

FIG. 7

| | Function | Default | Description |
|---|---|---|---|
| CDC | Channel Direction Control | M1 | M1: PCi, ⋯, PC(j-1)<br>M2: PC (i-1),⋯, PC1 / PCi, ⋯, PC(j-1)<br>M3: PCi, ⋯, PC(j-1) / PCn, ⋯, PCj<br>M4: PC (i-1),⋯, PC1 / PCi ,⋯, PC(j-1) / PCn, ⋯, PCj |
| OCS | Opposite direction Channel Select | M1 | M1: none<br>M2: PC1, ⋯, PC(i-1)<br>M3: PCj, ⋯, PCn<br>M4: PC1, ⋯, PC(i-1) & PCj, ⋯, PCn |

DISPLAY DEVICE AND METHOD OF DRIVING DISPLAY DEVICE

CROSS-REFERENCE TO RELATED APPLICATION

This application claims priority under 35 USC § 119 to Korean Patent Application No. 10-2021-0159509 filed on Nov. 18, 2021 in the Korean Intellectual Property Office (KIPO), the entire disclosure of which is herein incorporated by reference.

BACKGROUND

1. Field

Embodiments relate generally to a display device and a method of driving a display device. More particularly, embodiments of the present disclosure relate to a display device including a data driver and a method of driving a display device including a data driver.

2. Description of the Related Art

Flat panel display devices are used as display devices for replacing a cathode ray tube display device due to light-weight and thin characteristics thereof. As representative examples of such flat panel display devices, there are a liquid crystal display device, an organic light emitting display device, a quantum dot display device, and the like.

A display device may include a display area in which an image is displayed, and a pad area that is a non-display area. In this case, pixels may be disposed in the display area, and pad electrodes to which driving signals from an external device are applied may be disposed in the pad area. In addition, in order to transmit the driving signals to the pixels, wires for connecting the pad electrodes to the pixels may be arranged. Furthermore, a width of the display area in a row direction may be greater than a width of the pad area in the row direction. In this case, a display area overlapping the pad area in a column direction will be defined as a first display area, and a display area that does not overlap the pad area in the column direction will be defined as a second display area. In order to transmit driving signals to pixels disposed in the second display area, wires may pass through the first display area so as to be connected to the pixels disposed in the second display area.

Recently, a slidable display device for a larger display area according to a selection of a user of the display device has been developed. For example, the slidable display device may be driven in a first mode in which the second display area is bent so that an image is displayed only in the first display area, and a second mode in which an image is displayed in the first display area and at least a portion of the second display area.

SUMMARY

Embodiments provide a display device.

Embodiments provide a method of driving a display device.

According to embodiments of the present disclosure, a display device, which is a slidable display device, includes a display panel and a data driver. The display panel includes a first display area, a second display area that is taken in and out of the display device, and a pad area located on one side of the first display area. The display panel includes pixels disposed in the first and second display areas, and operating in a first mode in which an image is displayed in the first display area or a second mode in which an image is displayed in the first and second display areas. The data driver is configured to generate data voltages based on pixel data, output the data voltages to the pixels, and control an order of the data voltages output in the second mode.

In embodiments, the data driver may include an opposite direction channel selector and a channel direction controller. The opposite direction channel selector may be configured to receive a mode selection signal representing information on the first mode or the second mode, select a range of pixels in which the order of the data voltages is to be changed in an opposite direction among the pixels based on the mode selection signal, and generate an output signal representing the range of the pixels in which the order of the data voltages is to be changed in the opposite direction. The channel direction controller may be configured to receive the output signal, and generate a channel direction control signal representing an order of all the data voltages based on the output signal.

In embodiments, the data driver may be configured to output the data voltages to the pixels disposed in the first display area in a first order when driven in the first mode. In the first mode, the second display area may be in an in-state in which the second display area is located inside the display device, and an image may not be displayed in the second display area.

In embodiments, the data driver may be configured to output the data voltages to the pixels disposed in the first display area in a first order and output the data voltages to the pixels disposed in the second display area in a second order that is opposite to the first order when driven in the second mode. In the second mode, the second display area may be in an out-state in which the second display area is located outside the display device, and an image may be displayed in the second display area.

In embodiments, the display panel may further include a third display area that is able to be taken in and out of the display device, a third mode in which an image is displayed in the first and third display areas, and pixels disposed in the third area.

In embodiments, the data driver may be configured to output the data voltages to the pixels disposed in the first display area in a first order and output the data voltages to the pixels disposed in the third display area in a second order that is opposite to the first order when driven in the third mode.

In embodiments, in the third mode, the second display area may be in an in-state in which the second display area is located inside the display device, and an image may not be displayed in the second display area. The third display area may be in an out-state in which the third display area is located outside the display device, and an image may be displayed in the third display area.

In embodiments, the first display area may be located between the second display area and the third display area, and the display panel corresponding to the second display area, the first display area, and the third display area may be integrally formed.

In embodiments, the pad area may not overlap the second and third display areas.

In embodiments, the display panel may further include a fourth mode in which an image is displayed in the first, second, and third display areas.

In embodiments, the data driver may be configured to output the data voltages to the pixels disposed in the first display area in a first order, output the data voltages to the pixels disposed in the second display area in a second order that is opposite to the first order, and may output the data voltages to the pixels disposed in the third display area in the second order when driven in the fourth mode.

In embodiments, in the fourth mode, the second display area may be in an out-state in which the second display area is located outside the display device, and an image may be displayed in the second display area. The third display area may be in an out-state in which the third display area is located outside the display device, and an image may be displayed in the third display area.

In embodiments, the display device may further include first to $n^{th}$ pads (where n is an integer that is greater than or equal to 6) disposed in the pad area and first to $n^{th}$ data lines for connecting the first to $n^{th}$ pads to the pixels. The pixels may be arranged in first to $n^{th}$ pixel columns (where n is an integer that is greater than or equal to 6).

In embodiments, the pixels disposed in the second display area may be defined as first to $(i-1)^{th}$ pixel columns among the first to $n^{th}$ pixel columns. The pixels disposed in the first display area may be defined as $i^{th}$ to $(j-1)^{th}$ pixel columns among the first to $n^{th}$ pixel columns. The pixels disposed in the third display area may be defined as $j^{th}$ to $n^{th}$ pixel columns among the first to $n^{th}$ pixel columns.

In embodiments, a pixel located at a lowermost end of the first pixel column may be connected to the $(i-1)^{th}$ pad through the $(i-1)^{th}$ data line, and the $(i-1)^{th}$ data line may be disposed in the pad area, the first display area, and the second display area. A pixel located at a lowermost end of the $(i-1)^{th}$ pixel column may be connected to the first pad through the first data line, and the first data line may be disposed in the pad area, the first display area, and the second display area.

In embodiments, a pixel located at a lowermost end of the $n^{th}$ pixel column may be connected to the $j^{th}$ pad through the $j^{th}$ data line, and the $j^{th}$ data line may be disposed in the pad area, the first display area, and the third display area. A pixel located at a lowermost end of the $j^{th}$ pixel column may be connected to the $n^{th}$ pad through the $n^{th}$ data line, and the $n^{th}$ data line may be disposed in the pad area, the first display area, and the third display area.

In embodiments, a pixel located at a lowermost end of the $j^{th}$ pixel column may be connected to the $j^{th}$ pad through the $j^{th}$ data line, and the $j^{th}$ data line may be disposed in the pad area and the first display area. A pixel located at a lowermost end of the $(j-1)^{th}$ pixel column may be connected to the $(j-1)^{th}$ pad through the $(j-1)^{th}$ data line, and the $(j-1)^{th}$ data line may be disposed in the pad area and the first display area.

In embodiments, the display device may further include a controller, a gate driver, and a power supply unit. The controller may be configured to generate the pixel data, and may provide the pixel data to the data driver. The gate driver may be configured to generate a gate signal, and may provide the gate signal to the display panel. The power supply unit may be configured to generate a first power supply voltage and a second power supply voltage, and may provide the first and second power supply voltages to the display panel.

According to embodiments of the present disclosure, a method of driving a display device is provided as follows. A mode selection signal is received. It is determined whether the mode selection signal is one selected from second to fourth modes among first to fourth modes. A range of pixel columns, in which an order of data voltages corresponding to pixel columns in which an image is displayed is to be changed in an opposite direction, among pixel columns is selected. An output signal representing the range of the pixel columns in which the order of the data voltages is to be changed in the opposite direction is outputted. A channel direction control signal representing an order of all the data voltages to which the range of the pixel columns in which the order of the data voltages is to be changed in the opposite direction is applied is outputted.

In embodiments, the method may further include generating a sampling signal based on the channel direction control signal, and sampling input image data based on the sampling signal, storing the sampled input image data, changing a voltage level of the stored input image data, converting the input image data having the changed voltage level in a digital form into analog data voltages, and outputting the analog data voltages as the data voltages.

Since the display device according to the embodiments of the present disclosure includes the opposite direction channel selector and the channel direction controller, the order of the data voltages output from the data driver to the display panel may be adjusted to correspond to the first to fourth modes, so that the display quality of the display device may be improved.

According to the method of driving the display device of embodiments of the present disclosure, the opposite direction channel selector and the channel direction controller may adjust the order of the data voltages output from a data driver to a display panel to correspond to the first to fourth modes. Accordingly, display quality of the display device may be improved.

BRIEF DESCRIPTION OF THE DRAWINGS

Embodiments can be understood in more detail from the following description taken in conjunction with the accompanying drawings.

FIG. 7 is a block diagram for describing a channel direction controller and an opposite direction channel selector included in the data driver of FIG. 6 according to embodiments of the present disclosure.

DETAILED DESCRIPTION OF THE EMBODIMENTS

Figure 1:
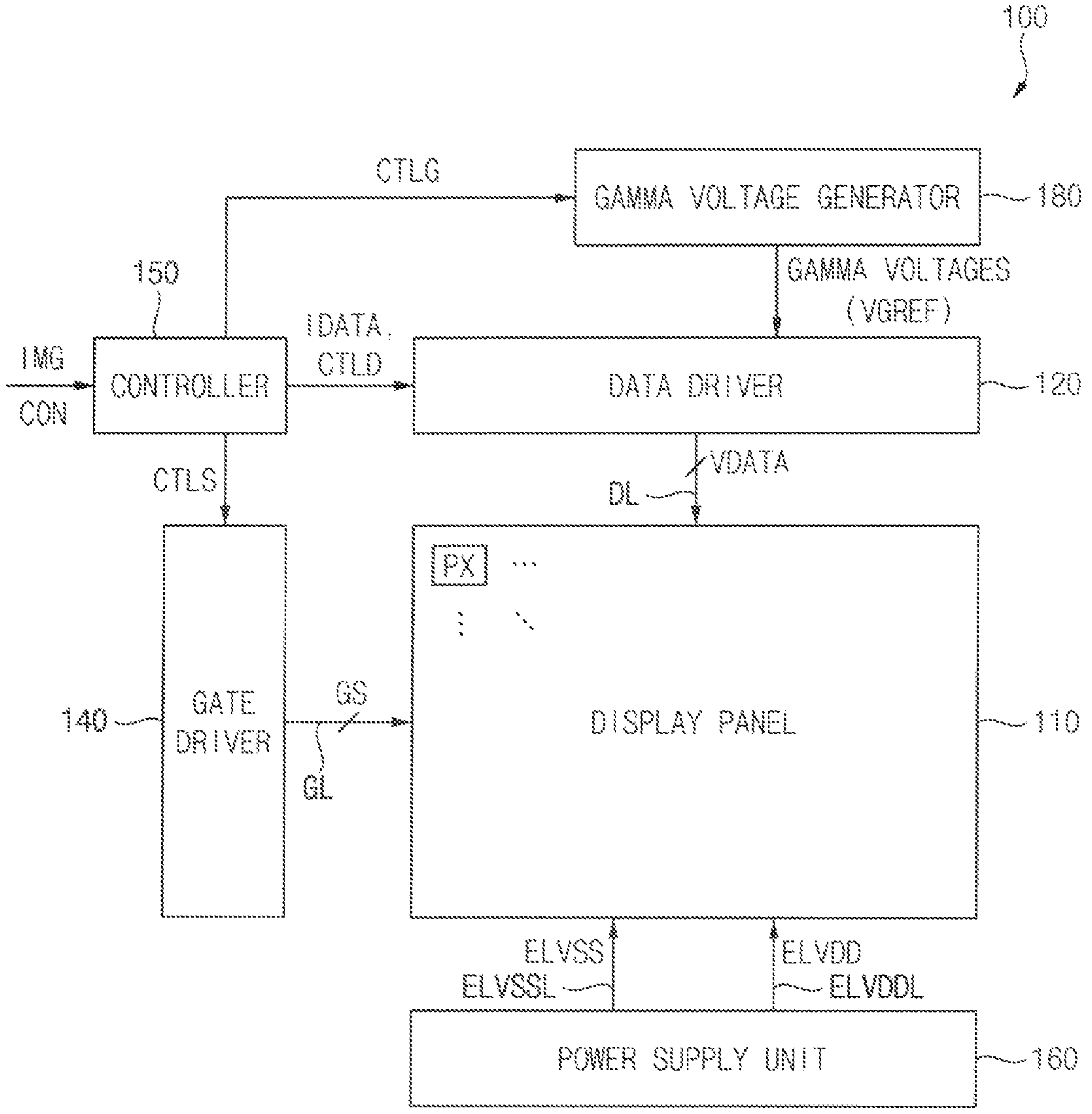
FIG. 1 is a block diagram showing a display device according to embodiments of the present disclosure.

Hereinafter, a display device and a method of driving a display device according to embodiments of the present disclosure will be described in detail with reference to the accompanying drawings. In the accompanying drawings, the same reference numerals or similar reference numerals refer to the same or similar elements.

FIG. 1 is a block diagram showing a display device according to embodiments of the present disclosure.

Referring to FIG. 1, a display device 100 may include a display panel 110 including a plurality of pixels PX, a controller 150, a data driver 120, a gate driver 140, a power supply unit 160, a gamma reference voltage generator 180, and the like. In this case, the data driver 120 may include an opposite direction channel selector 310, a channel direction controller 320, a shift register 210, a data sampling latch 220, a data holding latch 230, a level shifter 240, a digital-to-analog converter 250, and a buffer 260 (see FIG. 6).

According to embodiments, the display device 100 may function as a slidable display device capable of increasing or decreasing a display area in which an image is displayed according to a selection of a user of the display device 100.

The display panel 110 may include a plurality of pixels PX. The display panel 110 may further include a plurality of data lines DL, a plurality of gate lines GL, a first power supply voltage line ELVDDL, and a second power supply voltage line ELVSSL that are connected to the plurality of pixels PX.

In an embodiment, each of the pixels PX may include at least two transistors, at least one capacitor, and a light emitting element, and the display panel 110 may be a light emitting display panel. According to the embodiments, the display panel 110 may be a display panel of an organic light emitting display device (OLED). In an embodiment, the display panel 110 may include a display panel of an inorganic light emitting display device (ILED), a display panel of a quantum dot display device (QDD), a display panel of a liquid crystal display device (LCD), a display panel of a field emission display device (FED), a display panel of a plasma display device (PDP), or a display panel of an electrophoretic display device (EPD).

The controller 150 (e.g., a timing controller (T-CON)) may receive image data IMG and an input control signal CON from an external host processor (e.g., an application processor (AP), a graphic processing unit (GPU), or a graphic card). The image data IMG may be RGB image data (or RGB pixel data) including red image data (or red pixel data), green image data (or green pixel data), and blue image data (or blue pixel data). In addition, the image data IMG may include information on a driving frequency. The control signal CON may include a vertical synchronization signal, a horizontal synchronization signal, an input data enable signal, a master clock signal, and the like, but the embodiments are not limited thereto.

The controller 150 may convert the image data IMG into input image data IDATA by applying an algorithm (e.g., dynamic capacitance compensation (DCC), etc.) for correcting image quality to the image data IMG supplied from the external host processor. In some embodiments, when the controller 150 does not include an algorithm for improving image quality, the image data IMG may be output as the input image data IDATA. The controller 150 may supply the input image data IDATA to the data driver 120.

The controller 150 may generate a data control signal CTLD for controlling an operation of the data driver 120 and a gate control signal CTLS for controlling an operation of the gate driver 140 based on the input control signal CON. For example, the gate control signal CTLS may include a vertical start signal, gate clock signals, and the like, and the data control signal CTLD may include a horizontal start signal, a data clock signal, and the like.

The gate driver 140 may generate gate signals GS based on the gate control signal CTLS received from the controller 150. The gate driver 140 may output the gate signals GS to the pixels PX connected to the gate lines GL, respectively.

The power supply unit 160 may generate a first power supply voltage ELVDD and a second power supply voltage ELVSS, and may provide the first power supply voltage ELVDD and the second power supply voltage ELVSS to the pixels PX through the first power supply voltage line ELVDDL and the second power supply voltage line ELVSSL.

The data driver 120 may receive the data control signal CTLD and the input image data IDATA from the controller 150. The data driver 120 may receive a gamma reference voltage VGREF from the gamma reference voltage generator 180. The data driver 120 may convert digital input image data IDATA into an analog data voltage by using the gamma reference voltage VGREF. In this case, the analog data voltage obtained by the conversion will be defined as a data voltage VDATA. The data driver 120 may output data voltages VDATA to the pixels PX connected to the data lines DL based on the data control signal CTLD. According to the embodiments, the data driver 120 may change an order of the data voltages VDATA output to the pixels PX located on opposite sides of the display panel 110.

In some embodiments, the data driver 120 and the controller 150 may be implemented as a single integrated circuit, and such an integrated circuit may be referred to as a timing controller-embedded data driver (TED).

Figure 2:
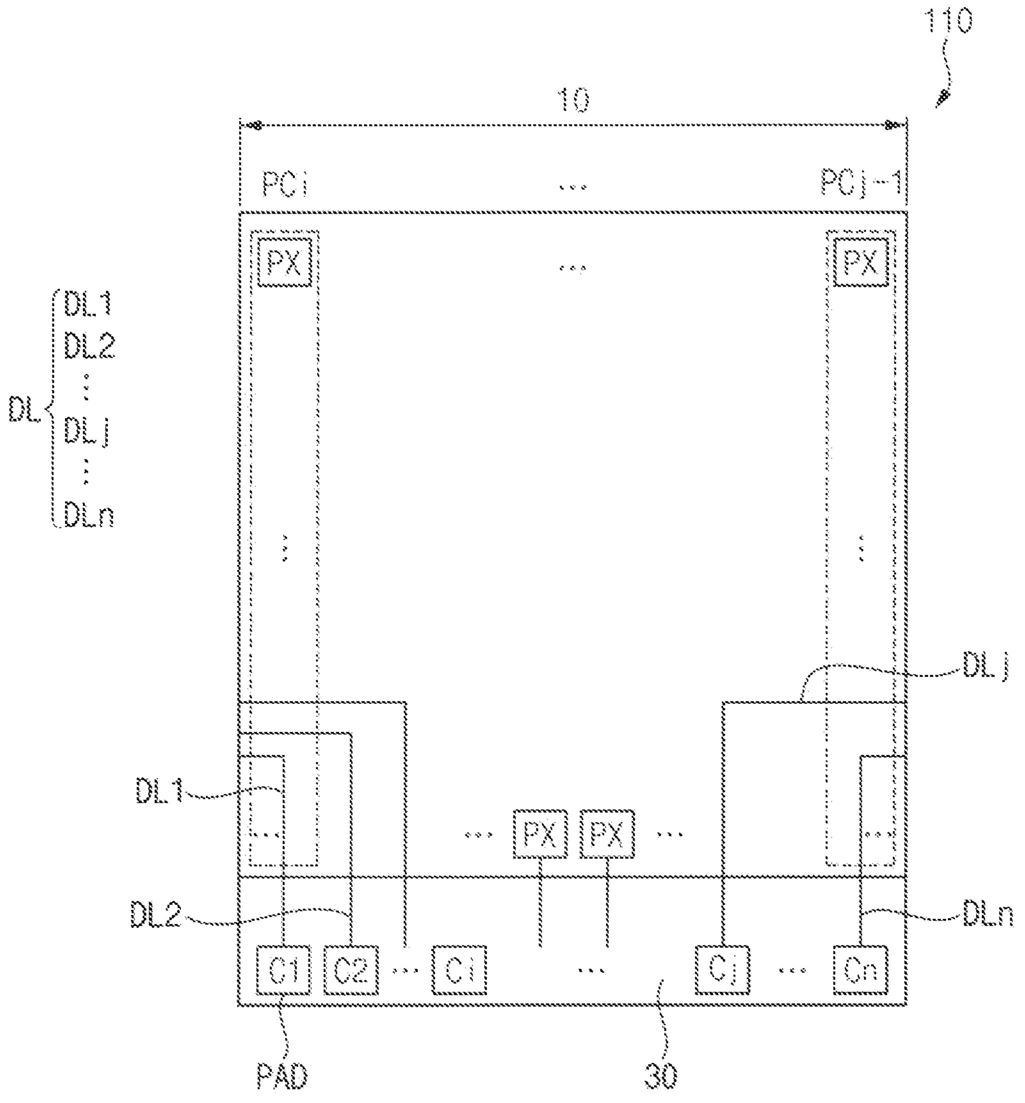
FIGS. 2, 3, 4, and 5 are plan views for describing first, second, third, and fourth modes of a display panel included in the display device of FIG. 1 according to embodiments of the present disclosure.
Figure 3:
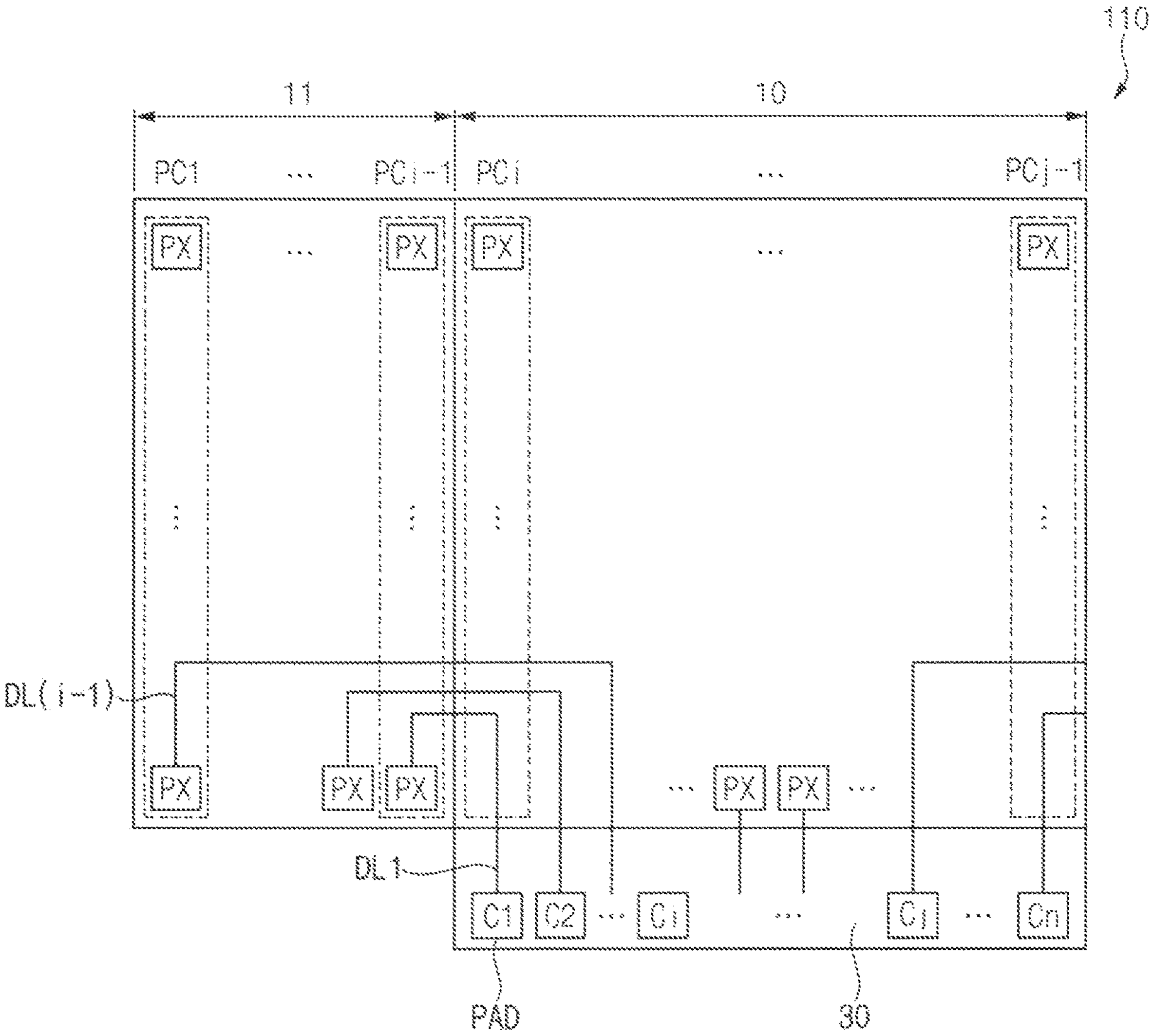
Figure 4:
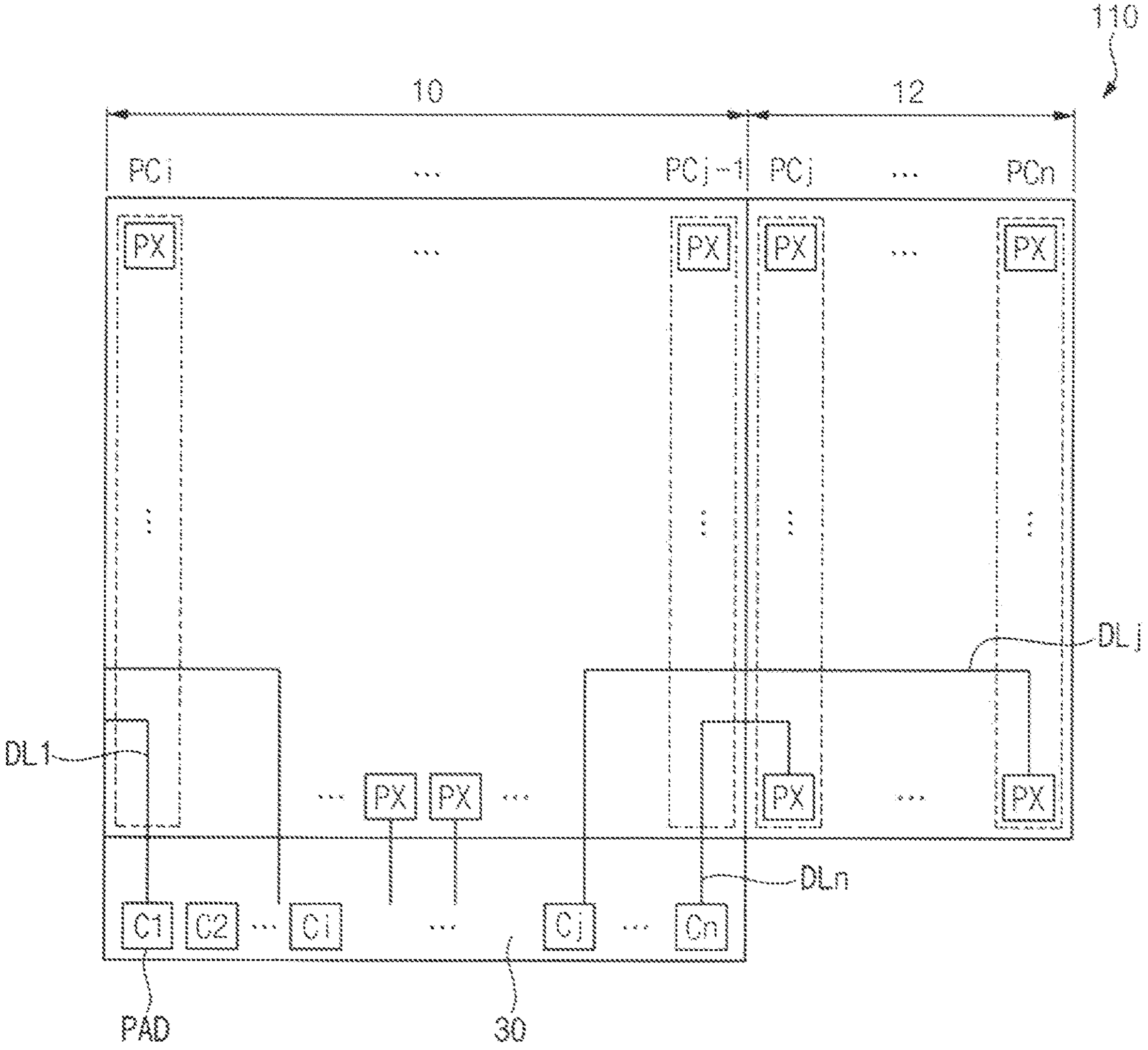
Figure 5:
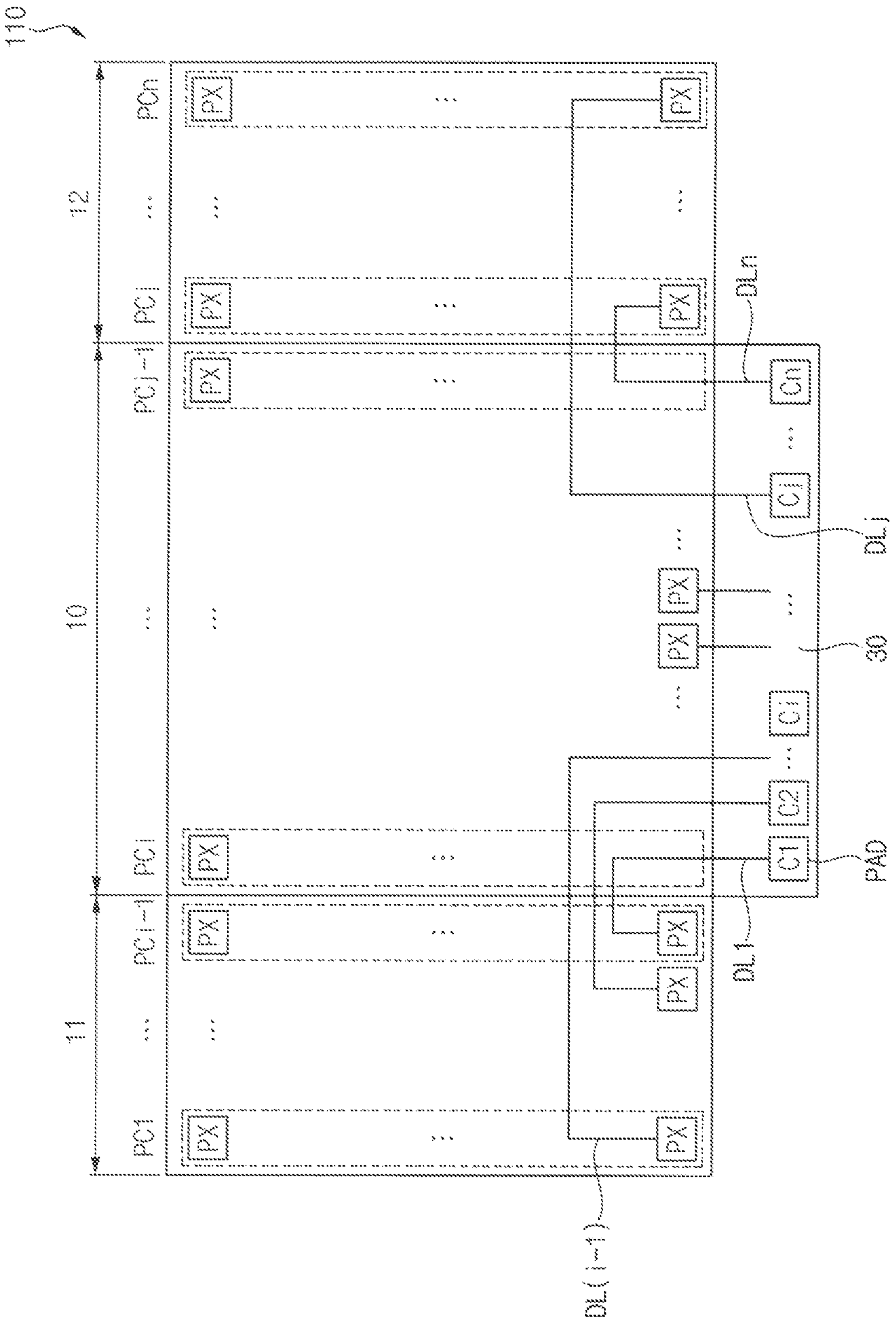

FIGS. 2, 3, 4, and 5 are plan views for describing first, second, third, and fourth modes of a display panel included in the display device of FIG. 1. For example, FIG. 2 is a plan view showing a first mode of the display device 100, FIG. 3 is a plan view showing a second mode of the display device 100, FIG. 4 is a plan view showing a third mode of the display device 100, and FIG. 5 is a plan view showing a fourth mode of the display device 100.

Referring to FIGS. 2 to 5, the display panel 110 may include a first display area 10, a second display area 11, a third display area 12, and a pad area 30. In this case, the first display area 10 may be located between the second display area 11 and the third display area 12, and the display panel 110 having the second display area 11, the first display area 10, and the third display area 12 may be integrally formed. In addition, the second display area 11 and the third display area 12 may be taken in and out of the display device 100.

The pixels PX may be disposed in the first display area 10, the second display area 11, and the third display area 12. The pixels PX disposed in the first display area 10, the second display area 11, and the third display area 12 will be defined as first to $n^{th}$ pixel columns PC1, . . . , and PCn. In other words, a pixel column PC may include pixels PX arranged in a column direction in the first to third display areas 10, 11, and 12. For example, first to $(i-1)^{th}$ pixel columns PC1, . . . , and PC(i−1) among the first to $n^{th}$ pixel columns PC1, . . . , and PCn may be located in the second display area 11, $i^{th}$ to $(j-1)^{th}$ pixel columns PCi, . . . , and PC(j−1) among the first to $n^{th}$ pixel columns PC1, . . . , and PCn may be located in the first display area 10, and $j^{th}$ to $n^{th}$ pixel columns PCj, . . . , and PCn among the first to $n^{th}$ pixel columns PC1, . . . , and PCn may be located in the third display area 12. In an embodiment, the first to $(i-1)^{th}$ pixel columns PC1 to PC(i−1) may be sequentially arranged in the second display area 11, the $i^{th}$ to $(j-1)^{th}$ pixel columns PCi to PC(j−1) may be sequentially arranged in the first display area 10, and the $j^{th}$ to $n^{th}$ pixel columns PCj to PCn may be sequentially arranged in the third display area 12. In this case, n is an integer that is greater than 6, i and j are integers between 1 and n, and i is an integer that is less than j. During a manufacturing process of the display device 100, a size of the display panel 110 may be determined, and the first to third display areas 10, 11, and 12 of the display panel 110 may also be determined. Since the first to third display areas 10, 11, and 12 are determined, i, j, and n values may also be determined.

Pad electrodes PAD to which driving signals provided from the data driver 120, the gate driver 140, and the controller 150 are applied may be disposed in the pad area 30. For convenience of description, only the pad electrodes PAD to which the data voltages VDATA provided from the data driver 120 are applied have been shown in FIGS. 2 to 5. In this case, the data driver 120 may be mounted on a flexible circuit board connected to the pad electrodes PAD. The present invention is not limited thereto. In an embodiment, the data driver 120 may be mounted in the pad area 30 of the display panel 110. In this case, the pad electrodes PAD may be connected to a driving integrated circuit IC corresponding to the data driver 120.

The pad electrodes PAD may include first to $n^{th}$ pads C1, . . . , and Cn. The first to $n^{th}$ pads C1, . . . , and Cn may be electrically connected to the first to $n^{th}$ pixel columns PC1, . . . , and PCn, respectively. In an embodiment, the first to $n^{th}$ pads C1 to Cn may be sequentially arranged in the pad area 30. The data lines DL may include a first data line to an $n^{th}$ data line DL1 to DLn that are connected the first to $n^{th}$ pads C1 to Cn, respectively. In an embodiment, the first to $(i-1)^{th}$ pixel columns PC1 to PC(i−1) in the second area 11 may be connected to the $(i-1)^{th}$ to first pads C(i−1) to C1 using the $(i-1)^{th}$ to first data lines DL(i−1) to DL1, respectively. Each of the first to $(i-1)^{th}$ data lines DL1 to DL(i−1) may connect a corresponding pixel column among the first to $(i-1)^{th}$ pixel columns PC1 to PC(i−1) to a corresponding pad among the first to $(i-1)^{th}$ pads C1 to C(i−1) without overlapping another data line. For example, the first data line DL1 may connect the first pad C1 to the $(i-1)^{th}$ pixel column PC(i−1) without overlapping another data line, and the $(i-1)^{th}$ data line DL(i−1) may connect the $(i-1)^{th}$ pad C(i−1) to the first pixel column PC1 without overlapping another data line. In an embodiment, the $j^{th}$ to $n^{th}$ pixel columns PCj to PCn in the third area 12 may be connected to the $n^{th}$ to $j^{th}$ pads Cn to Cj using the $n^{th}$ to $j^{th}$ data lines DLn to DLj, respectively. Each of the $j^{th}$ to $n^{th}$ data lines DLj to DLn may connect a corresponding pixel column among the $j^{th}$ to $n^{th}$ pixel columns PCj to PCn to a corresponding pad among the $j^{th}$ to $n^{th}$ pads Cj to Cn without overlapping another data line. For example, the $j^{th}$ data line DLj may connect the $j^{th}$ pad Cj to the $n^{th}$ pixel column PCn without overlapping another data line, and the $n^{th}$ data line DLn may connect the $n^{th}$ pad Cn to the $j^{th}$ pixel column PCj without overlapping another data line.

For example, a pixel PX located at a lowermost end of the first pixel column PC1 may be connected to the $(i-1)^{th}$ pad C(i−1) through the $(i-1)^{th}$ data line DL(i−1). In an embodiment, the $(i-1)^{th}$ data line DL(i−1) may be disposed in the pad area 30, the first display area 10, and the second display area 11 in order to connect the pixel PX located at the lowermost end of the first pixel column PC1 to the $(i-1)^{th}$ pad C(i−1). In addition, a pixel PX located at a lowermost end of the $(i-1)^{th}$ pixel column PC(i−1) may be connected to the first pad C1 through the first data line DL1, and the first data line DL1 may be disposed in the pad area 30, the first display area 10, and the second display area 11 in order to connect the pixel PX located at the lowermost end of the $(i-1)^{th}$ pixel column PC(i−1) to the first pad C1.

For example, a pixel PX located at a lowermost end of the $n^{th}$ pixel column PCn may be connected to the $j^{th}$ pad Cj through the $j^{th}$ data line DLj, and the $j^{th}$ data line DLj may be disposed in the pad area 30, the first display area 10, and the third display area 12 in order to connect the pixel PX located at the lowermost end of the $n^{th}$ pixel column PCn to the $j^{th}$ pad Cj. In addition, a pixel PX located at a lowermost end of the $j^{th}$ pixel column PCj may be connected to the $n^{th}$ pad Cn through the $n^{th}$ data line DLn, and the $n^{th}$ data line DLn may be disposed in the pad area 30, the first display area 10, and the third display area 12 in order to connect the pixel PX located at the lowermost end of the $j^{th}$ pixel column PCj to the $n^{th}$ pad Cn.

In an embodiment, a pixel PX located at a lowermost end of the $i^{th}$ pixel column PCi may be connected to the $i^{th}$ pad Ci through the $i^{th}$ data line DLi, and the $i^{th}$ data line DL may be disposed in the pad area 30 and the first display area 10 in order to connect the pixel PX located at the lowermost end of the $i^{th}$ pixel column PCi to the $i^{th}$ pad Ci. In addition, a pixel PX located at a lowermost end of the $(j-1)^{th}$ pixel column PC(j−1) may be connected to the $(j-1)^{th}$ pad C(j−1) through the $(j-1)^{th}$ data line DL(j−1), and the $(j-1)^{th}$ data line DL(j−1) may be disposed in the pad area 30 and the first display area 10 in order to connect the pixel PX located at the lowermost end of the $(j-1)^{th}$ pixel column PC(j−1) to the $(j-1)^{th}$ pad C(j−1).

The pad area 30 may be located on one side of the first display area 10 (or adjacent to the first display area 10). In other words, the pad area 30 may overlap the first display area 10 in the column direction, and the pad area 30 may not overlap the second display area 11 and the third display area 12 in the column direction. For example, in order to reduce a dead space of the display panel 110, a width of the pad area 30 in the row direction may be smaller than a width of a combined display area of the first to third display areas 10, 11, and 12 in the row direction.

The first to $(i-1)^{th}$ data lines DL1 to DL(i−1) may pass through the first display area 10 so as to be connected to pixels PX located at lowermost ends of the $(i-1)^{th}$ to first pixel columns PC(i−1), . . . , and PC1, respectively. The $j^{th}$ to $n^{th}$ data lines DLj to DLn may pass through the first display area 10 so as to be connected to pixels PX located at lowermost ends of the $n^{th}$ to $j^{th}$ pixel columns PCn, . . . , and PCj, respectively. In this case, the data voltages VDATA provided to the first to $(i-1)^{th}$ pads C1, . . . , and C(i−1) may be provided in an opposite order of an increasing pad number of the first to $(i-1)^{th}$ pads C1, . . . , and C(i−1), and the data voltages VDATA provided to the $j^{th}$ to $n^{th}$ pads Cj, . . . , and Cn may be provided in the opposite order of an increasing pad number of the $j^{th}$ to $n^{th}$ pads Cj to Cn. For example, the data voltages VDATA may be sequentially supplied in the order of from the $(i-1)^{th}$ to first pads C(i−1) to C1, from the $i^{th}$ to $(j-1)^{th}$ pads Ci to C(j−1), and from the $n^{th}$ to $j^{th}$ pads Cn to Cj.

Unlike the present invention, as a comparative example, if the data voltages VDATA provided to the first to $(i-1)^{th}$ pads C1, . . . , and C(i−1) and the $j^{th}$ to $n^{th}$ pads Cj, . . . , and Cn are not provided in the opposite order, an image displayed in each of the second and third display areas 11 and 12 may be inverted horizontally. In this case, display quality of the display device 100 may be reduced.

The display device 100 may be driven in first to fourth modes.

FIG. 2 shows a state in which the display panel 110 is driven in the first mode. As shown in FIG. 2, an image may be displayed in the first display area 10 of the display panel 110 in the first mode. The second display area 11 and the third display area 12 may be bent so as to be located under the first display area 10. In other words, in the first mode, the second display area 11 and the third display area 12 may be in an in-state in which the second display area 11 and the third display area 12 are located inside the display device 100, and an image may not be displayed in the second display area 11 and the third display area 12.

FIG. 3 shows a state in which the display panel 110 is driven in the second mode. For example, according to a selection of the user of the display device 100, the second display area 11 may be spread out toward a front surface of the display device 100 by sliding a movement member located on a left side of the display device 100. As shown in FIG. 3, an image may be displayed in the first display area 10 and the second display area 11 of the display panel 110 in the second mode. The third display area 12 may be bent so as to be located under the first display area 10. In other words, in the second mode, the second display area 11 may be in an out-state in which the second display area 11 is located outside the display device 100, the third display area 12 may be in an in-state in which the third display area 12 is located inside the display device 100, and an image may not be displayed in the third display area 12.

FIG. 4 shows a state in which the display panel 110 is driven in the third mode. For example, according to a selection of the user of the display device 100, the third display area 12 may be spread out toward the front surface of the display device 100 by sliding a movement member located on a right side of the display device 100. As shown in FIG. 4, an image may be displayed in the first display area 10 and the third display area 12 of the display panel 110 in the third mode. The second display area 11 may be bent so as to be located under the first display area 10. In other words, in the third mode, the second display area 11 may be in an in-state in which the second display area 11 is located inside the display device 100, the third display area 12 may be in an out-state in which the third display area 12 is located outside the display device 100, and an image may not be displayed in the second display area 11.

FIG. 5 shows a state in which the display panel 110 is driven in the fourth mode. For example, according to a selection of the user of the display device 100, the second and third display areas 11 and 12 may be spread out toward the front surface of the display device 100 by sliding the movement members located on the left and right sides of the display device 100. As shown in FIG. 5, an image may be displayed in the first display area 10, the second display area 11, and the third display area 12 of the display panel 110 in the fourth mode. In other words, in the fourth mode, the second display area 11 and the third display area 12 may be in an out-state in which the second display area 11 and the third display area 12 are located outside the display device 100.

However, although the display device 100 according to the present disclosure has been described as being driven in the first to fourth modes, the configuration of the present disclosure is not limited thereto. For example, the display device 100 may be driven in a mode in which only the second display area 11 is driven, a mode in which only the third display area 12 is driven, a mode in which only the second display area 11 and the third display area 12 are driven, and the like. The first to fourth modes will be in more detail described withe reference to FIG. 6 an d7 using references M1 to M4, respectively.

Figure 6:
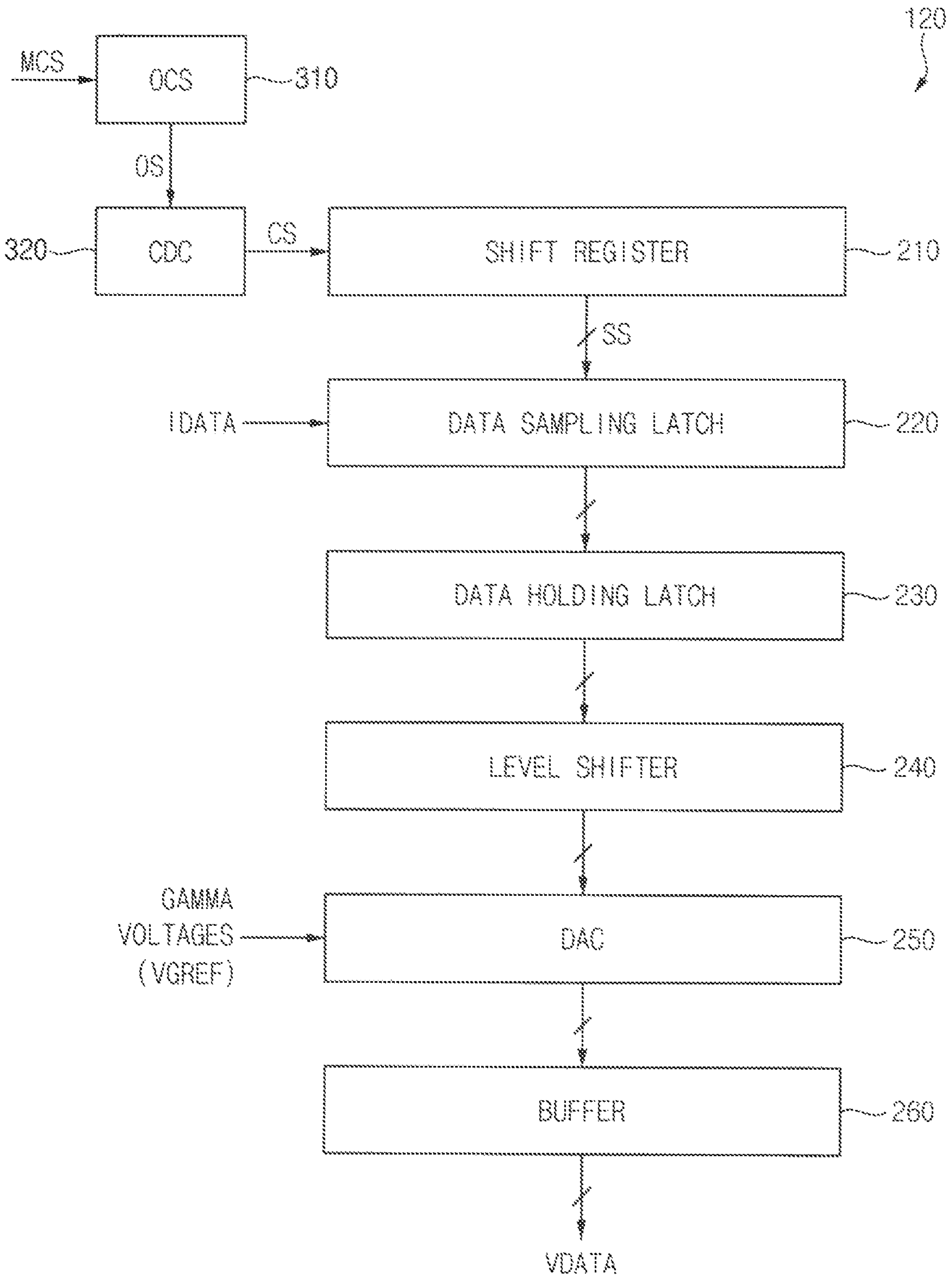
FIG. 6 is a block diagram for describing a data driver included in the display device of FIG. 1 according to embodiments of the present disclosure.

FIG. 6 is a block diagram for describing a data driver included in the display device of FIG. 1, and FIG. 7 is a block diagram for describing a channel direction controller and an opposite direction channel selector included in the data driver of FIG. 6.

Referring to FIGS. 6 and 7, the data driver 120 may include an opposite direction channel selector 310, a channel direction controller 320, a shift register 210, a data sampling latch 220, a data holding latch 230, a level shifter 240, a digital-to-analog converter 250, and The opposite direction channel selector 310 may receive a mode selection signal MCS. The mode selection signal MCS may include or may represent information on an operation mode of the display device 100 that operates in one of the first to fourth modes M1, M2, M3, and M4. The mode selection signal MCS may be provided from the controller 150 or a driver configured to control a sliding operation of the movement member of the display device 100. The opposite direction channel selector 310 may select a range of pixel columns (or a range of pixels) in which an order of data voltages VDATA corresponding to pixel columns in which an image is displayed is to be changed in an opposite direction among the first to $n^{th}$ pixel columns PC1, . . . , and PCn based on the mode selection signal MCS, generate an output signal OS including the range of the pixel columns in which the order of the data voltages VDATA is to be changed in the opposite direction, and provide the output signal OS to the channel direction controller 320.

As shown in FIG. 7, setting values corresponding to the first to fourth modes M1, M2, M3, and M4 may be stored in the opposite direction channel selector 310. The setting value may correspond to the range of the pixel columns in which the order of the data voltages VDATA corresponding to the pixel columns in which the image is displayed is to be changed in the opposite direction among the first to $n^{th}$ pixel columns PC1, . . . , and PCn. In other words, the range of the pixel columns in which the order of the data voltages VDATA is to be changed in the opposite direction may correspond to the first to $(i-1)^{th}$ pixel columns PC1, . . . , and PC(i−1) located in the second display area 11 and the $j^{th}$ to $n^{th}$ pixel columns PCj, . . . , and PCn located in the third display area 12.

For example, when the display device 100 is driven in the first mode M1, the opposite direction channel selector 310 that has received the mode selection signal MCS may transmit the output signal OS to the channel direction controller 320, while information on a pixel column in which the order of the data voltages is changed in the opposite direction may not exist in the output signal OS. In other words, since the image is displayed only in the first display area 10 of the display panel 110 in the first mode M1, the pixel columns in which the order of the data voltages VDATA is to be changed in the opposite direction may not exist. In this case, the data voltages VDATA corresponding to the $i^{th}$ to $(j-1)^{th}$ pixel columns PCi, and PC(j−1) may be output in a forward direction (e.g., a first order). For example, as shown in FIG. 2, the $j^{th}$ to $(j-1)^{th}$ pixel columns PCi to PC(j−1) of the first display area 10 are arranged in the first order, and each of the $i^{th}$ to $(j-1)^{th}$ data lines DLi to DL(j−1) connects a corresponding pixel column among the $j^{th}$ to $(j-1)^{th}$ pixel columns to a corresponding pad among the $i^{th}$ to $(j-1)^{th}$ pads Ci to C(j−1). The data voltages VDATA for the first display area 10 may be sequentially supplied to the $j^{th}$ to $(j-1)^{th}$ pads Ci to C(j−1) in the first order, and then to the $j^{th}$ to $(j-1)^{th}$ pixel columns PCi to PC(j−1) via the $j^{th}$ to $(j-1)^{th}$ data lines DLi to DL(j−1), respectively.

When the display device 100 is driven in the second mode M2, the opposite direction channel selector 310 that has received the mode selection signal MCS may transmit the output signal OS corresponding to the second mode M2 to the channel direction controller 320. For example, the output signal OS corresponding to the second mode M2 may be a signal for selecting the first to $(i-1)^{th}$ pixel columns PC1, . . . , and PC(i−1) as the pixel columns in which the order of the data voltages VDATA is to be changed in the opposite direction. In other words, since the image is displayed in the first display area 10 and the second display area 11 of the display panel 110 in the second mode M2, the order of the data voltages VDATA to be provided to the pixel columns corresponding to the second display area 11 may be changed in the opposite direction. In this case, the data voltages VDATA corresponding to the first to $(i-1)^{th}$ pixel columns PC1, . . . , and PC(i−1) may be output in a reverse direction (e.g., a second order opposite to the first order), and the data voltages VDATA corresponding to the $j^{th}$ to $(j-1)^{th}$ pixel columns PCi, . . . , and PC(j−1) may be output in the forward direction (e.g., the first order). For example, as shown in FIG. 3, the first to $(i-1)^{th}$ pixel columns PC1 to PC(i−1) of the second display area 11 are arranged in the first order, and the first to $(i-1)^{th}$ pads C1 to C(i−1) are arranged in the first order. Each of the first to $(i-1)^{th}$ data lines DL1 to DL(i−1) connects a corresponding pixel column among the first to $(i-1)^{th}$ pixel columns PC1 to PC(i−1) to a corresponding pad among the first to $(i-1)^{th}$ pads C1 to C(i−1). The data voltages VDATA for the second display area 11 may be sequentially supplied from the $(i-1)^{th}$ pad C(i−1) to the first pad C1, and then to the first to $(i-1)^{th}$ pixel columns PC1 to PC(i−1) via the $(i-1)^{th}$ to first data lines DL(i−1) to D1, respectively.

In addition, in some embodiments, only a portion of the second display area 11 may be spread out toward the front surface of the display device 100 by sliding the movement member located on the left side of the display device 100. For example, when the second display area 11 corresponds to $k^{th}$ to $(i-1)^{th}$ pixel columns PCk, . . . , and PC(i−1) (where k is an integer between 1 and i−1) among the first to $(i-1)^{th}$ pixel columns PC1, . . . , and PC(i−1), the output signal OS may be a signal for selecting the $k^{th}$ to $(i-1)^{th}$ pixel columns PCk, . . . , and PC(i−1) as the pixel columns in which the order of the data voltages VDATA is to be changed in the opposite direction. In this case, the portion of the second display area 11 may be taken in the display device 100, and the remaining portion of the second display area 11 may be taken out of the display device 100.

When the display device 100 is driven in the third mode M3, the opposite direction channel selector 310 that has received the mode selection signal MCS may transmit the output signal OS corresponding to the third mode M3 to the channel direction controller 320. For example, the output signal OS corresponding to the third mode M3 may be a signal for selecting the $j^{th}$ to $n^{th}$ pixel columns PCj, . . . , and PCn as the pixel columns in which the order of the data voltages VDATA is to be changed in the opposite direction. In other words, since the image is displayed in the first display area 10 and the third display area 12 of the display panel 110 in the third mode M3, the order of the data voltages VDATA to be provided to the pixel columns corresponding to the third display area 12 may be changed in the opposite direction. In this case, the data voltages VDATA corresponding to the $i^{th}$ to $(j-1)^{th}$ pixel columns PCi, . . . , and PC(j−1) may be output in the forward direction (e.g., the first order), and the data voltages VDATA corresponding to the $j^{th}$ to $n^{th}$ pixel columns PCj, . . . , and PCn may be output in the reverse direction (e.g., the second order). For example, as shown in FIG. 4, the $j^{th}$ to $n^{th}$ pixel columns PCj to PCn of the third display area 12 are arranged in the first order, and the $j^{th}$ to $n^{th}$ pads Cj to Cn are arranged in the first order. Each of the $j^{th}$ to $n^{th}$ data lines DLj to DLn connects a corresponding pixel column among the $j^{th}$ to $n^{th}$ pixel columns PCj to PCn to a corresponding pad among the $j^{th}$ to $n^{th}$ pads Cj to Cn. The data voltages VDATA for the third display area 12 may be sequentially supplied from the nth pad Cn to the $j^{th}$ pad Cj, and then to the $j^{th}$ and $n^{th}$ pixel columns PCj to PCn via the $j^{th}$ to $n^{th}$ data lines DLj to DLn, respectively.

In addition, in some embodiments, only a portion of the third display area 12 may be spread out toward the front surface of the display device 100 by sliding the movement member located on the right side of the display device 100. For example, when the third display area 12 corresponds to $j^{th}$ to $p^{th}$ pixel columns PCj, . . . , and PCp (where p is an integer between j and n) among the $j^{th}$ to $n^{th}$ pixel columns PCj, . . . , and PCn, the output signal OS may be a signal for selecting the $j^{th}$ to $p^{th}$ pixel columns PCj, . . . , and PCp as the pixel columns in which the order of the data voltages VDATA is to be changed in the opposite direction. In this case, the portion of the third display area 12 may be taken in the display device 100, and the remaining portion of the third display area 12 may be taken out of the display device 100.

When the display device 100 is driven in the fourth mode M4, the opposite direction channel selector 310 that has received the mode selection signal MCS may transmit the output signal OS corresponding to the fourth mode M4 to the channel direction controller 320. For example, the output signal OS corresponding to the fourth mode M4 may be a signal for selecting the first to $(i-1)^{th}$ pixel columns PC1, . . . , and PC(i−1) and the $j^{th}$ to $n^{th}$ pixel columns PCj, . . . , and PCn as the pixel columns in which the order of the data voltages VDATA is to be changed in the opposite direction. In other words, since the image is displayed in the first display area 10, the second display area 11, and the third display area 12 of the display panel 110 in the fourth mode M4, the order of the data voltages VDATA to be provided to the pixel columns corresponding to each of the second and third display areas 11 and 12 may be changed in the opposite direction.

In this case, the data voltages VDATA corresponding to the first to $(i-1)^{th}$ pixel columns PC1, . . . , and PC(i−1) may be output in the reverse direction (e.g., the second order), the data voltages VDATA corresponding to the $i^{th}$ to $(j-1)^{th}$ pixel columns PCi, . . . , and PC(j−1) may be output in the forward direction (e.g., the first order), and the data voltages VDATA corresponding to the $j^{th}$ to $n^{th}$ pixel columns PCj, . . . , and PCn may be output in the reverse direction (e.g., the second order).

In addition, in some embodiments, only a portion of the second display area 11 and a portion of the third display area 12 may be spread out toward the front surface of the display device 100 by sliding the movement member located on the left side of the display device 100 and the movement member located on the right side of the display device 100. For example, when the second display area 11 corresponds to the $k^{th}$ to $(i-1)^{th}$ pixel columns PCk, . . . , and PC(i−1) (where k is an integer between 1 and i−1) among the first to $(i-1)^{th}$ pixel columns PC1, . . . , and PC(i−1), and the third display area 12 corresponds to the $j^{th}$ to $p^{th}$ pixel columns PCj, . . . , and PCp (where p is an integer between j and n) among the $j^{th}$ to $n^{th}$ pixel columns PCj, . . . , and PCn, the output signal OS may be a signal for selecting the $k^{th}$ to $(i-1)^{th}$ pixel columns PCk, . . . , and PC(i−1) and the $j^{th}$ to $p^{th}$ pixel columns PCj, . . . , and PCp as the pixel columns in which the order of the data voltages VDATA is to be changed in the opposite direction. In this case, the portion of each of the second display area 11 and the third display area 12 may be taken in the display device 100, and the remaining portion of each of the second display area 11 and the third display area 12 may be taken out of the display device 100.

Referring to FIGS. 6 and 7, the channel direction controller 320 may receive the output signal OS. The output signal OS may include or may represent information on the range of the pixel columns in which the order of the data voltages VDATA corresponding to the pixel columns in which the image is displayed is to be changed in the opposite direction among the first to $n^{th}$ pixel columns PC1, . . . , and PCn (i.e., among the first to $n^{th}$ pads C1 to Cn) so that the image is sequentially displayed from the first pixel column PC1 to the $n^{th}$ pixel column PCn. As described with reference to FIGS. 2 to 5, the order (i.e., the first order or the forward order) of supplying the data voltages VDATA to the $j^{th}$ to $(j-1)^{th}$ pads Ci to C(j−1) for the first display area 10 is opposite to the order (i.e., the second order or the opposite order) of supplying the data voltages VDATA to the first to $(i-1)^{th}$ pads Ci to C(i−1) for the second area 11 and the $j^{th}$ to $n^{th}$ pads Cj to Cn for the third area 12. The channel direction controller 320 may generate a channel direction control signal CS based on the output signal OS, and may provide the channel direction control signal CS to the shift register 210.

As shown in FIG. 7, the channel direction controller 320 may store setting values corresponding to the first to fourth modes M1, M2, M3, and M4. The setting value may correspond to the order of the data voltages VDATA corresponding to the pixel columns in which the image is displayed among the first to $n^{th}$ pixel columns PC1, . . . , and PCn. In other words, the setting value may be information corresponding to an order of all the data voltages VDATA to which the range of the pixel columns in which the order of the data voltages VDATA is to be changed in the opposite direction is applied (e.g., an order of the data voltages VDATA corresponding to one pixel row)based on the output signal OS.

For example, when the display device 100 is driven in the first mode M1, the channel direction controller 320 may receive the output signal OS from the opposite direction channel selector 310, while the information on the pixel column in which the order of the data voltages is changed in the opposite direction may not exist in the output signal OS. In other words, the pixel columns in which the order of the data voltages is to be changed in the opposite direction may not exist. In addition, since the image is displayed only in the first display area 10 of the display panel 110 in the first mode M1, the data voltages VDATA corresponding to an order of the $i^{th}$ to $(j-1)^{th}$ pixel columns PCi, . . . , and PC(j−1) may be output. Accordingly, the channel direction controller 320 may generate the channel direction control signal CS to provide the channel direction control signal CS to the shift register 210 so that the data voltages VDATA may be output in the order of the $i^{th}$ to $(j-1)^{th}$ pixel columns PCi, . . . , and PC(j−1).

When the display device 100 is driven in the second mode M2, the channel direction controller 320 may receive the output signal OS from the opposite direction channel selector 310 to change an order of the first to $(i-1)^{th}$ pixel columns PC1, . . . , and PC(i−1) in the opposite direction. In addition, since the image is displayed in the first display area 10 and the second display area 11 of the display panel 110 in the second mode M2, the data voltages VDATA corresponding to an order of the $(i-1)^{th}$ to first pixel columns PC(i−1), . . . , and PC1 and the $i^{th}$ to $(j-1)^{th}$ pixel columns PCi, . . . , and PC(j−1) may be output. Accordingly, the channel direction controller 320 may generate the channel direction control signal CS to provide the channel direction control signal CS to the shift register 210 so that the data voltages VDATA may be output in the order of the $(i-1)^{th}$ to first pixel columns PC(i−1), and PC1 and the $j^{th}$ to $(j-1)^{th}$ pixel columns PCi, . . . , and PC(j−1). In an embodiment, in the second mode M2, the channel direction controller 320 may generate the channel direction control signal CS to provide the channel direction control signal CS to the shift register 210 so that the data voltages VDATA may be output and supplied in the order of from the $(i-1)^{th}$ pad C(i−1) to the first pad C1. The $(i-1)^{th}$ to first pads C(i−1) to C1 are connected to the first to $(i-1)^{th}$ pixel columns PC1 to PC(i−1), respectively.

When the display device 100 is driven in the third mode M3, the channel direction controller 320 may receive the output signal OS from the opposite direction channel selector 310 to change an order of the $j^{th}$ to $n^{th}$ pixel columns PCj, . . . , and PCn in the opposite direction. In addition, since the image is displayed in the first display area 10 and the third display area 12 of the display panel 110 in the third mode M3, the data voltages VDATA corresponding to an order of the $i^{th}$ to $(j=1)^{th}$ pixel columns PCi, . . . , and PC(j−1) and the $n^{th}$ to $j^{th}$ pixel columns PCn, . . . , and PCj may be output. Accordingly, the channel direction controller 320 may generate the channel direction control signal CS to provide the channel direction control signal CS to the shift register 210 so that the data voltages VDATA may be output in the order of the $i^{th}$ to $(j-1)^{th}$ pixel columns PCi, . . . , and PC(j−1) and the $n^{th}$ to $j^{th}$ pixel columns PCn, . . . , and PCj. In an embodiment, in the third mode M3, the channel direction controller 320 may generate the channel direction control signal CS to provide the channel direction control signal CS to the shift register 210 so that the data voltages VDATA may be output and supplied in the order of from the $n^{th}$ pad Cn to the $j^{th}$ pad Cj. The $n^{th}$ to $j^{th}$ pads Cn to Cj are connected to the $j^{th}$ to $n^{th}$ PCj to PCn, respectively.

When the display device 100 is driven in the fourth mode M4, the channel direction controller 320 receives the output signal OS from the opposite direction channel selector 310 to change an order of the data voltages VDATA of the first to $(i-1)^{th}$ pixel columns PC1, . . . , and PC(i−1) and the $j^{th}$ to $n^{th}$ pixel columns PCj, . . . , and PCn in the opposite direction. In addition, since the image is displayed in the first display area 10, the second display area 11, and the third display area 12 of the display panel 110 in the fourth mode M4, the data voltages VDATA corresponding to an order of the $(i-1)^{th}$ to first pixel columns PC(i−1), and PC1, the $i^{th}$ to $(j-1)^{th}$ pixel columns PCi, . . . , and PC(j−1), and the $n^{th}$ to $j^{th}$ pixel columns PCn, . . . , and PCj may be output. Accordingly, the channel direction controller 320 may generate the channel direction control signal CS including or representing the above information to provide the channel direction control signal CS to the shift register 210 so that the data voltages VDATA may be output in the order of the $(i-1)^{th}$ to first pixel columns PC(i−1), . . . , and PC1, the $i^{th}$ to $(j-1)^{th}$ pixel columns PCi, . . . , and PC(j−1), and the $n^{th}$ to $j^{th}$ pixel columns PCn, . . . , and PCj. In an embodiment, in the fourth mode M4, the channel direction controller 320 may generate the channel direction control signal CS to provide the channel direction control signal CS to the shift register 210 so that the data voltages VDATA may be output in the order of from the $(i-1)^{th}$ pad C(i−1) to the first pad C1, from the $j^{th}$ pad Ci to the $(j-1)^{th}$ pad C(j−1), and from $n^{th}$ pad Cn to the $j^{th}$ pad Cj.

Referring again to FIG. 6, the shift register 210 may receive the channel direction control signal CS. The shift register 210 may generate a sampling signal SS based on the channel direction control signal CS. The shift register 210 may transmit the sampling signal SS to the data sampling latch 220.

The data sampling latch 220 may receive the input image data IDATA and the sampling signal SS. The data sampling latch 220 may sample the input image data IDATA based on the sampling signal SS. The input image data IDATA may include information on pixel data corresponding to the first to $n^{th}$ pixel columns PC1, . . . , and PCn. In this case, when the display device 100 is driven in the first mode M1, pixel data corresponding to the $i^{th}$ to $(j-1)^{th}$ pixel columns PCi, . . . , and PC(j−1) that are ordered in the forward direction may be sampled. When the display device 100 is driven in the second mode M2, pixel data corresponding to the first to $(i-1)^{th}$ pixel columns PC1, . . . , and PC(i−1) having the order changed in the opposite direction and the pixel data corresponding to the $i^{th}$ to $(j-1)^{th}$ pixel columns PCi, . . . , and PC(j−1) that are ordered in the forward direction may be sampled. When the display device 100 is driven in the third mode M3, the pixel data corresponding to the $i^{th}$ to$(j-1)^{th}$ pixel columns PCi, . . . , and PC(j−1) that are ordered in the forward direction and pixel data corresponding to the $j^{th}$ to $n^{th}$ pixel columns PCj, . . . , and PCn having the order changed in the opposite direction may be sampled. When the display device 100 is driven in the fourth mode M4, the pixel data corresponding to the first to $(i-1)^{th}$ pixel columns PC1, . . . , and PC(i−1) having the order changed in the opposite direction, the pixel data corresponding to the $i^{th}$ to $(j-1)^{th}$ pixel columns PCi, . . . , and PC(j−1) that are ordered in the forward direction, and the pixel data corresponding to the $j^{th}$ to $n^{th}$ pixel columns PCj, . . . , and PCn having the order changed in the opposite direction may be sampled. The data sampling latch 220 may provide the sampled input image data IDATA to the data holding latch 230.

The data holding latch 230 may receive the sampled input image data IDATA. The data holding latch 230 may store the input image data IDATA sampled by the data sampling latch 220. The data holding latch 230 may provide the stored input image data IDATA to the level shifter 240.

The level shifter 240 may receive the stored input image data IDATA. The level shifter 240 may change a voltage level of the input image data IDATA received from the data holding latch 230 into a voltage level suitable for the digital-to-analog converter 250. The level shifter 240 may provide the input image data IDATA having the changed voltage level to the digital-to-analog converter 250.

The digital-to-analog converter 250 may receive the input image data IDATA having the changed voltage level. The digital-to-analog converter 250 may convert digital input image data IDATA into an analog data voltage by using the gamma reference voltage VGREF. In this case, the analog data voltage obtained by the conversion will be defined as a data voltage VDATA. The digital-to-analog converter 250 may provide data voltages VDATA to the buffer 260.

The buffer 260 may receive the data voltages VDATA. The buffer 260 may be electrically connected to the pad electrodes PAD, and the data voltages VDATA may be provided to the pad electrodes PAD.

Since the display device 100 according to the embodiments of the present disclosure includes the opposite direction channel selector 310 and the channel direction controller 320, the order of the data voltages VDATA output from the data driver 120 to the display panel 110 may be adjusted to correspond to the first to fourth modes M1, M2, M3, and M4, so that the display quality of the display device 100 may be improved.

However, although the display panel 110 according to the present disclosure has been described as including the first to third display areas 10, 11, and 12, the configuration of the present disclosure is not limited thereto. For example, according to some embodiments, the display panel 110 may include a configuration including the first display area 10 and the second display area 11, a configuration including the first display area 10 and the third display area 12, and the like. In this case, a driving scheme of each of the opposite direction channel selector 310 and the channel direction controller 320 may be appropriately changed according to the configuration of the display panel 110.

Figure 8:
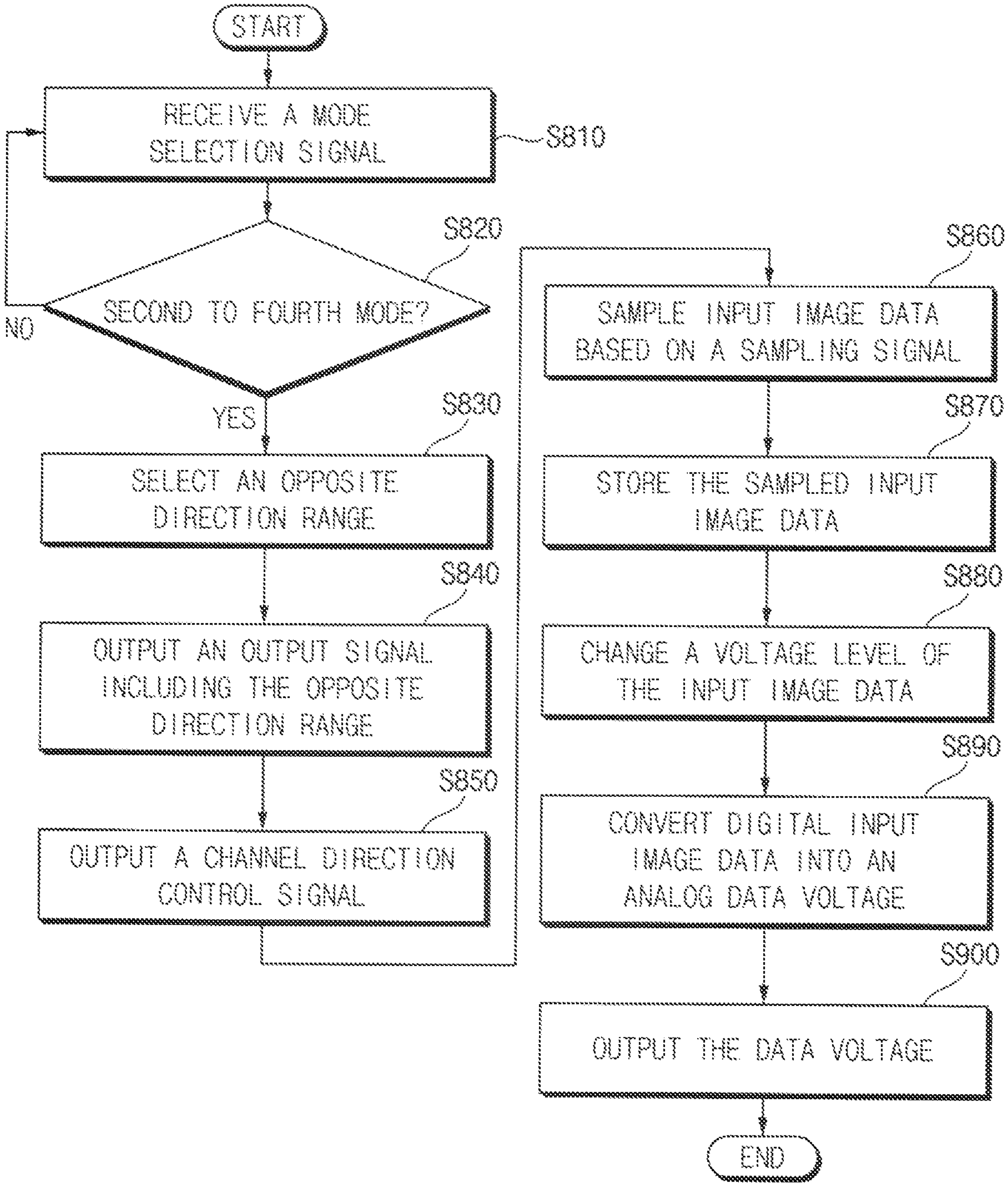
FIG. 8 is a block diagram showing a method of driving a display device according to embodiments of the present disclosure.

FIG. 8 is a block diagram showing a method of driving a display device according to embodiments of the present disclosure.

Referring to FIG. 8, a method of driving a display device 100 may include: receiving a mode selection signal MCS (S810); determining whether the mode selection signal MCS is one selected from second to fourth modes M2, M3, and M4 among first to fourth modes M1, M2, M3, and M4 (S820); selecting a range of pixel columns in which an order of data voltages VDATA corresponding to pixel columns in which an image is displayed is to be changed in an opposite direction among pixel columns (S830); outputting an output signal OS including the range of the pixel columns in which the order of the data voltages VDATA is to be changed in the opposite direction (S840); outputting a channel direction control signal CS including an order of all the data voltages VDATA to which the range of the pixel columns in which the order of the data voltages VDATA is to be changed in the opposite direction is applied (S850); generating a sampling signal SS based on the channel direction control signal CS, and sampling input image data IDATA based on the sampling signal SS (S860); storing the sampled input image data IDATA (S870); changing a voltage level of the stored input image data IDATA (S880); converting the input image data IDATA having the changed voltage level in a digital form into analog data voltages VDATA (S890); and outputting the data voltages VDATA (S900).

Referring again to FIGS. 6, 7, and 8, an opposite direction channel selector 310 may receive the mode selection signal MCS. The mode selection signal MCS may include information on an operation mode of the display device 100 that operates in one of the first to fourth modes M1, M2, M3, and M4.

The opposite direction channel selector 310 may determine whether the mode selection signal MCS is one of the second to fourth modes M2, M3, and M4.

When the mode selection signal MCS is one selected from the second to fourth modes M2, M3, and M4 among the first to fourth modes M1, M2, M3, and M4, the opposite direction channel selector 310 may select the range of the pixel columns in which the order of the data voltages VDATA corresponding to the pixel columns in which the image is displayed is to be changed in the opposite direction among first to $n^{th}$ pixel columns PC1, . . . , and PCn.

The opposite direction channel selector 310 may generate the output signal OS including the range of the pixel columns in which the order of the data voltages VDATA is to be changed in the opposite direction, and may output the output signal OS.

A channel direction controller 320 may receive the output signal OS. The output signal OS may include information on the range of the pixel columns in which the order of the data voltages VDATA corresponding to the pixel columns in which the image is displayed is to be changed in the opposite direction among the first to $n^{th}$ pixel columns PC1, . . . , and PCn. The channel direction controller 320 may store setting values corresponding to the first to fourth modes M1, M2, M3, and M4. The setting value may correspond to the order of the data voltages VDATA corresponding to the pixel columns in which the image is displayed among the first to $n^{th}$ pixel columns PC1, . . . , and PCn. In other words, the setting value may be information corresponding to the order of all the data voltages VDATA to which the range of the pixel columns in which the order of the data voltages VDATA is to be changed in the opposite direction is applied based on the output signal OS. The channel direction controller 320 may generate the channel direction control signal CS including the setting value based on the output signal OS, and may output the channel direction control signal CS.

A shift register 210 may receive the channel direction control signal CS. The shift register 210 may generate the sampling signal SS based on the channel direction control signal CS, and may output the channel direction control signal CS.

A data sampling latch 220 may receive the input image data IDATA and the sampling signal SS. The data sampling latch 220 may sample the input image data IDATA based on the sampling signal SS. The input image data IDATA may include information on pixel data corresponding to the first to $n^{th}$ pixel columns PC1, . . . , and PCn. In this case, when the display device 100 is driven in the first mode M1, pixel data corresponding to $j^{th}$ to $(j-1)^{th}$ pixel columns PCi, . . . , and PC(j−1) may be sampled. When the display device 100 is driven in the second mode M2, pixel data corresponding to first to $(i-1)^{th}$ pixel columns PC1, . . . , and PC(i−1) having an order changed in the opposite direction and the pixel data corresponding to the $j^{th}$ to $(j-1)^{th}$ pixel columns PCi, . . . , and PC(j−1) may be sampled. When the display device 100 is driven in the third mode M3, the pixel data corresponding to the $i^{th}$ to $(j-1)^{th}$ pixel columns PCi, . . . , and PC(j−1) and pixel data corresponding to $j^{th}$ to $n^{th}$ pixel columns PCj, . . . , and PCn having an order changed in the opposite direction may be sampled. When the display device 100 is driven in the fourth mode M4, the pixel data corresponding to the first to $(i-1)^{th}$ pixel columns PC1, . . . , and PC(i−1) having the order changed in the opposite direction, the pixel data corresponding to the $j^{th}$ to $(j-1)^{th}$ pixel columns PCi, . . . , and PC(j−1), and the pixel data corresponding to the $j^{th}$ to $n^{th}$ pixel columns PCj, . . . , and PCn having the order changed in the opposite direction may be sampled. The data sampling latch 220 may output the sampled input image data IDATA.

A data holding latch 230 may receive the sampled input image data IDATA. The data holding latch 230 may store the input image data IDATA sampled by the data sampling latch 220. The data holding latch 230 may output the stored input image data IDATA.

A level shifter 240 may receive the stored input image data IDATA. The level shifter 240 may change a voltage level of the input image data IDATA received from the data holding latch 230 into a voltage level suitable for the digital-to-analog converter 250. The level shifter 240 may output the input image data IDATA having the changed voltage level.

A digital-to-analog converter 250 may receive the input image data IDATA having the changed voltage level. The digital-to-analog converter 250 may convert digital input image data IDATA into an analog data voltage by using a gamma reference voltage VGREF. In this case, the analog data voltage obtained by the conversion will be defined as a data voltage VDATA. The digital-to-analog converter 250 may output data voltages VDATA.

A buffer 260 may receive the data voltages VDATA, and may output the data voltages VDATA. The buffer 260 may be electrically connected to pad electrodes PAD, and the data voltages VDATA may be provided to the pad electrodes PAD.

According to the method of driving the display device 100 of embodiments of the present disclosure, the opposite direction channel selector 310 and the channel direction controller 320 may adjust the order of the data voltages VDATA output from a data driver 120 to a display panel 110 to correspond to the first to fourth modes M1, M2, M3, and M4. Accordingly, display quality of the display device 100 may be improved.

Figure 9:
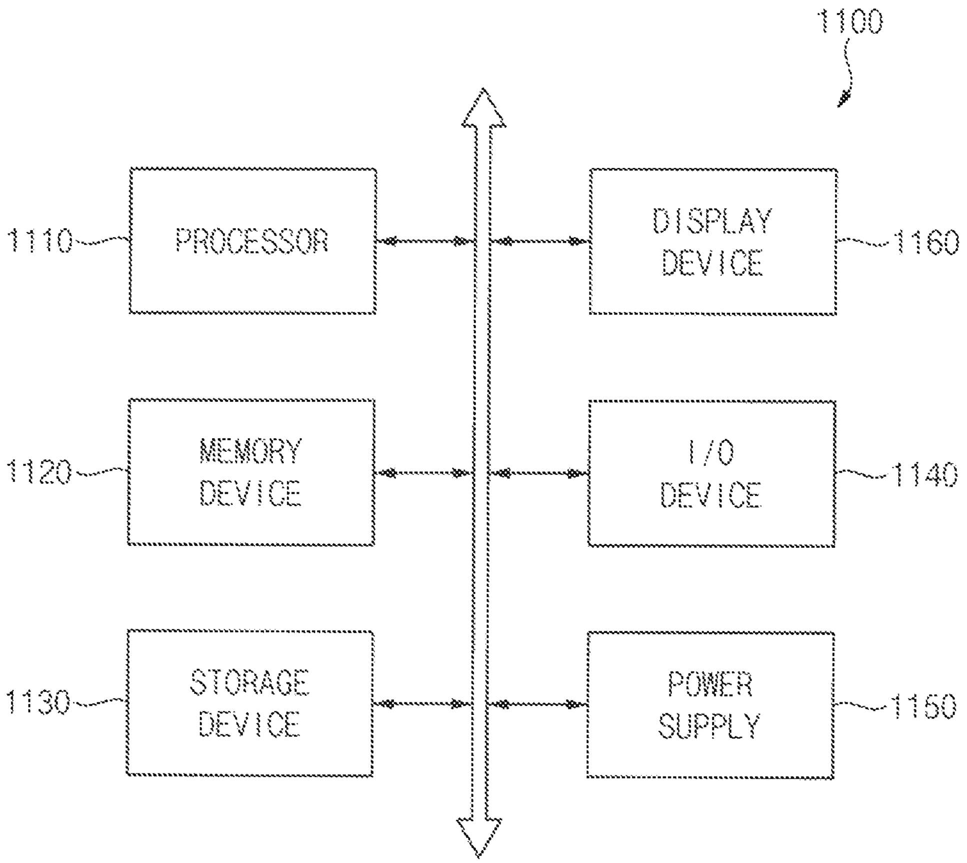
FIG. 9 is a block diagram illustrating an electronic device including a display device according to the present disclosure.

FIG. 9 is a block diagram illustrating an electronic device including a display device according to the present disclosure.

Referring to FIG. 9, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

The display device 1160 may include a display panel including a plurality of pixels, a controller, a data driver, a gate driver, a power supply unit, a gamma reference voltage generator, and the like. In this case, the data driver may include an opposite direction channel selector, a channel direction controller, a shift register, a data sampling latch, a data holding latch, a level shifter, a digital-to-analog converter, and a buffer. In embodiments, since the display device 1160 includes the opposite direction channel selector and the channel direction controller, the order of the data voltages output from the data driver to the display panel may be adjusted to correspond to the first to fourth modes, so that the display quality of the display device 1160 may be improved.

According to embodiments, the electronic device 1000 may be any electronic device including the display device 1160 such as a smart phone, a wearable electronic device, a tablet computer, a mobile phone, a television (TV), a digital TV, a 3D TV, a personal computer, a home appliance, a laptop computer, a personal digital assistant, a portable multimedia player, a digital camera, a music player, a portable game console, a navigation device, or the like.

The present disclosure may be applied to various electronic devices including a display device. For example, the present disclosure may be applied to numerous electronic devices such as vehicle-display devices, ship-display devices, aircraft-display devices, portable communication devices, exhibition display devices, information transfer display devices, medical-display devices, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device, which is a slidable display device, comprising:

a display panel including:

a first display area, a second display area that is configured to be taken in and out of the display device, a pad area located on a first side of the first display area, a plurality of pixels disposed in the first and second display areas, and configured to operate in one of a first mode in which an image is displayed in the first display area and a second mode in which an image is displayed in the first and second display areas; and a data driver configured to:

receive input image data;

generate a plurality of data voltages based on pixel data of the input image data, output the plurality of data voltages to the plurality of pixels, and control an order of the plurality of data voltages output in the second mode, wherein the data driver includes:

an opposite direction channel selector configured to:

receive a mode selection signal representing information on one of the first mode and the second mode without receiving the input image data, select a range of pixels in which the order of the plurality of data voltages is to be changed in an opposite direction among the plurality of pixels based on the mode selection signal, and generate an output signal representing the range of the pixels in which the order of the plurality of data voltages is to be changed in the opposite direction;

a channel direction controller connected to the opposite direction channel selector and configured to:

receive the output signal from the opposite direction channel selector, and generate a channel direction control signal representing an order of all of the plurality of data voltages based on the output signal;

a shift register connected to the channel direction controller and generating a sampling signal based on the channel direction control signal;

a data sampling latch connected to the shift register, wherein the data sampling latch samples the input image data based on the sampling signal; and a buffer connected to the data sampling latch and outputting the sampled input image data as the plurality of data voltages to the plurality of pixels.

2. The display device of claim 1, wherein the data driver is configured to output the plurality of data voltages to the plurality of pixels disposed in the first display area in a first order when driven in the first mode, and, wherein in the first mode, the second display area is located inside the display device, and an image is not displayed in the second display area.

3. The display device of claim 1, wherein the data driver is configured to:

output the plurality of data voltages to the pixels disposed in the first display area in a first order, and output the plurality of data voltages to the pixels disposed in the second display area in a second order that is opposite to the first order when driven in the second mode, and wherein in the second mode, the second display area is located outside the display device, and an image is displayed in the second display area.

4. The display device of claim 1, wherein the display panel further includes a third display area that is configured to be taken in and out of the display device, wherein the plurality of pixels are further disposed in the third display area, and wherein the plurality of pixels are configured to operate in a third mode in which an image is displayed in the first and third display areas.

5. The display device of claim 4, wherein the data driver is configured to:

output the plurality of data voltages to the plurality of pixels disposed in the first display area in a first order, and output the plurality of data voltages to the plurality of pixels disposed in the third display area in a second order that is opposite to the first order when driven in the third mode.

6. The display device of claim 5, wherein, in the third mode, the second display area is in an in-state in which the second display area is located inside the display device, and an image is not displayed in the second display area, and wherein the third display area is in an out-state in which the third display area is located outside the display device, and an image is displayed in the third display area.

7. The display device of claim 4, wherein the first display area is located between the second display area and the third display area, and wherein the display panel corresponding to the second display area, the first display area, and the third display area is integrally formed.

8. The display device of claim 4, wherein the pad area does not overlap the second and third display areas.

9. The display device of claim 4, wherein the display panel further includes a fourth mode in which an image is displayed in the first, second, and third display areas.

10. The display device of claim 9, wherein the data driver is configured to: in the fourth mode, output the plurality of data voltages to the plurality of pixels disposed in the first display area in a first order, output the plurality of data voltages to the plurality of pixels disposed in the second display area in a second order that is opposite to the first order, and output the plurality of data voltages to the plurality of pixels disposed in the third display area in the second order.

11. The display device of claim 10, wherein, in the fourth mode, the second display area is in an out-state in which the second display area is located outside the display device, and the third display area is in an out-state in which the third display area is located outside the display device, and wherein, in the fourth mode, an image is displayed in the first to third display areas.

12. The display device of claim 4, further comprising:

first to $n^{th}$ pads (where n is an integer that is greater than or equal to 6) disposed in the pad area; and first to $n^{th}$ data lines for connecting the first to $n^{th}$ pads to the plurality of pixels, wherein the plurality of pixels are arranged in first to $n^{th}$ pixel columns (where n is an integer that is greater than or equal to 6).

13. The display device of claim 12, wherein the pixels disposed in the second display area are defined as first to $(i-1)^{th}$ pixel columns among the first to $n^{th}$ pixel columns, wherein the pixels disposed in the first display area are defined as $i^{th}$ to $(j-1)^{th}$ pixel columns among the first to $n^{th}$ pixel columns, and wherein the pixels disposed in the third display area are defined as $i^{th}$ to $n^{th}$ pixel columns among the first to $n^{th}$ pixel columns.

14. The display device of claim 13, wherein a pixel located at a lowermost end of the first pixel column is connected to the $(i-1)^{th}$ pad through the $(i-1)^{th}$ data line, and the $(i-1)^{th}$ data line is disposed in the pad area, the first display area, and the second display area, and wherein a pixel located at a lowermost end of the $(i-1)^{th}$ pixel column is connected to the first pad through the first data line, and the first data line is disposed in the pad area, the first display area, and the second display area.

15. The display device of claim 14, wherein a pixel located at a lowermost end of the $n^{th}$ pixel column is connected to the $i^{th}$ pad through the $i^{th}$ data line, and the $i^{th}$ data line is disposed in the pad area, the first display area, and the third display area, and wherein a pixel located at a lowermost end of the $i^{th}$ pixel column is connected to the $n^{th}$ pad through the $n^{th}$ data line, and the $n^{th}$ data line is disposed in the pad area, the first display area, and the third display area.

16. The display device of claim 15, wherein a pixel located at a lowermost end of the $i^{th}$ pixel column is connected to the $i^{th}$ pad through the $i^{th}$ data line, and the $i^{th}$ data line is disposed in the pad area and the first display area, and wherein a pixel located at a lowermost end of the $(j-1)^{th}$ pixel column is connected to the $(j-1)^{th}$ pad through the $(j-1)^{th}$ data line, and the $(j-1)^{th}$ data line is disposed in the pad area and the first display area.

17. The display device of claim 1, further comprising:

a controller configured to generate the pixel data, and provide the pixel data to the data driver;

a gate driver configured to generate a gate signal, and provide the gate signal to the display panel; and a power supply unit configured to generate a first power supply voltage and a second power supply voltage, and provide the first and second power supply voltages to the display panel.

18. A method of driving a display device, the method comprising:

receiving a mode selection signal;

determining whether the mode selection signal is one selected from second to fourth modes among first to fourth modes;

selecting a range of pixel columns in which an order of an image being displayed is to be changed in an opposite direction among pixel columns;

outputting an output signal representing the range of the pixel columns in which the order of the image being displayed is to be changed in the opposite direction; and outputting a channel direction control signal representing an order of applying data voltages to the range of the pixel columns;

generating a sampling signal based on the channel direction control signal;

sampling input image data of the image based on the sampling signal; and storing the sampled input image data.

19. The method of claim 18, further comprising:

changing a voltage level of the stored input image data;

converting the input image data having the changed voltage level in a digital form into a plurality of analog data voltages; and outputting the plurality of analog data voltages as the plurality of data voltages.

* * * * *